United States Patent
Ma et al.

(10) Patent No.: US 12,130,405 B2
(45) Date of Patent: Oct. 29, 2024

(54) SYSTEM AND METHOD FOR ESTIMATING POROSITY OF POROUS FORMATIONS USING PERMITTIVITY MEASUREMENTS

(71) Applicants: Baker Hughes Oilfield Operations LLC, Houston, TX (US); Saudi Arabian Oil Company, Dhahran (SA)

(72) Inventors: Shouxiang Ma, Dhahran (SA); Guodong Jin, Houston, TX (US); Ryan Antle, Houston, TX (US); Fei Le, Houston, TX (US); Salah M Al-Ofi, Khobar (SA)

(73) Assignees: Baker Hughes Oilfield Operations LLC, Houston, TX (US); Saudi Arabian Oil Company, Dhahran (SA)

( * ) Notice: Subject to any disclaimer, the term of this patent is extended or adjusted under 35 U.S.C. 154(b) by 107 days.

(21) Appl. No.: 17/950,216

(22) Filed: Sep. 22, 2022

(65) Prior Publication Data
US 2023/0100983 A1     Mar. 30, 2023

Related U.S. Application Data

(60) Provisional application No. 63/250,435, filed on Sep. 30, 2021.

(51) Int. Cl.
*G01V 3/38* (2006.01)
*G01V 3/26* (2006.01)
*G01V 3/32* (2006.01)

(52) U.S. Cl.
CPC .................. *G01V 3/38* (2013.01); *G01V 3/26* (2013.01); *G01V 3/32* (2013.01)

(58) Field of Classification Search
CPC ..... G01V 3/18; G01V 3/26; G01V 3/32; G01V 3/38
USPC .......................................................... 702/13
See application file for complete search history.

(56) References Cited

U.S. PATENT DOCUMENTS

| | | | |
|---|---|---|---|
| 8,884,623 | B2 | 11/2014 | Anderson |
| 8,947,092 | B2 | 2/2015 | Li |
| 2007/0061082 | A1 | 3/2007 | Seleznev |
| 2010/0198638 | A1 | 8/2010 | Deffenbaugh |
| 2017/0176624 | A1 | 6/2017 | Donadille |

(Continued)

OTHER PUBLICATIONS

International Search Report and Written Opinion mailed Jan. 6, 2023 in corresponding PCT Application No. PCT/US22/44866.

*Primary Examiner* — John H Le
(74) *Attorney, Agent, or Firm* — Hogan Lovells US LLP

(57) ABSTRACT

A system for analysis of isolated and connected porosities of a porous formation using permittivity is disclosed. An electrical subsystem can provide electrical signals for one or more of the porous formation or a representation of the porous formation; and the system can determine one or more of a rate of permittivity change (RPC) or permittivity ratio (PR) from a first estimation model that relates permittivity measurements and frequencies that are associated with the electrical signals, so that the system can generate a second estimation model using one or more of the RPC or the PR, associated with the isolated and connected porosities, where the second estimation model can be used with a total porosity of the porous formation to estimate or predict an isolated porosity and a connected porosity of a production porous formation.

20 Claims, 12 Drawing Sheets

(56) References Cited

U.S. PATENT DOCUMENTS

2017/0276832 A1 9/2017 Kouchmeshky
2022/0397699 A1* 12/2022 Jin .................... G01V 20/00

* cited by examiner

SYSTEM AND METHOD FOR ESTIMATING POROSITY OF POROUS FORMATIONS USING PERMITTIVITY MEASUREMENTS

CROSS-REFERENCES TO RELATED APPLICATIONS

This application is related to and claims the benefit of priority from U.S. Provisional Application No. 63/250,435, titled SYSTEM AND METHOD FOR ESTIMATING POROSITY OF POROUS FORMATIONS USING PERMITTIVITY MEASUREMENTS, and filed on Sep. 30, 2021, the entire disclosure of which is hereby incorporated by reference herein for all intents and purposes.

BACKGROUND

1. Field of Invention

This invention relates in general to equipment used in the oil and natural gas industry, and in particular, to analysis of pore connectivity or porosities using permittivity measures of dielectric property values.

2. Description of the Prior Art

A drilled well is a structure formed in subterranean or underwater geologic structures, or layers. Such subterranean or underwater geologic structures or layers incorporate pressure and temperature that may be further enhanced by supplementing formation fluids (such as liquids, gasses or a combination) into a drill site or a well site (such as a wellbore). Logging tools (such as wireline logging) or core analysis may be used with capability to evaluate a porous formation. Such evaluation may be performed in a subsurface or in a laboratory environment. However, it may not provide a degree of pore connectivity that may be useful to understand how individual pores are connected to each other.

SUMMARY

In at least one embodiment, a system for wellbore or testing operations is disclosed. The system includes an electrical subsystem to provide electrical signals for one or more of a porous formation or a representation of the porous formation and includes at least one processor to execute instructions from a memory to cause the system to perform functions herein. At least one function is to determine one or more dielectric property values that relate permittivity measurements and frequencies from the electrical signals. At least a second function is to generate a model from the one or more dielectric property values. The model provides structural property values associated with isolated and connected porosities of the porous formation or the representation of the porous formation. A further function is to determine a rock formation petrophysical property value of the porous formation or the representation of the porous formation using the model and using a total porosity of the porous formation or the representation of the porous formation. Another function is to estimate or predict one or more of an isolated porosity or a connected porosity of the downhole rock formation based at least on the rock formation petrophysical property value. Further, the wellbore or testing operation is enabled based at least in part on the estimated or predicted one or more of the isolated porosity or the connected porosity of the downhole rock formation.

In at least one embodiment, a method for wellbore or testing operations is also disclosed. Such a method may use, in part, an electrical subsystem and at least one processor. The method includes determining one or more dielectric property values that relate permittivity measurements and frequencies from the electrical signals. A further step of the method is to generate a model from the one or more dielectric property values. The model provides structural property values associated with isolated and connected porosities of the porous formation or the representation of the porous formation. A further step is to determine a rock formation petrophysical property value for the porous formation or the representation of the porous formation using the model and using a total porosity of the porous formation or the representation of the porous formation. Then, the method includes estimating or predicting one or more of an isolated porosity or a connected porosity of the downhole rock formation based at least on the rock formation petrophysical property value. Further, the method includes performing the wellbore or testing operation based at least in part on the estimated or predicted one or more of the isolated porosity or the connected porosity of the downhole rock formation.

BRIEF DESCRIPTION OF THE DRAWINGS

Various embodiments in accordance with the present disclosure will be described with reference to the drawings, in which.

DETAILED DESCRIPTION

Figure 1:
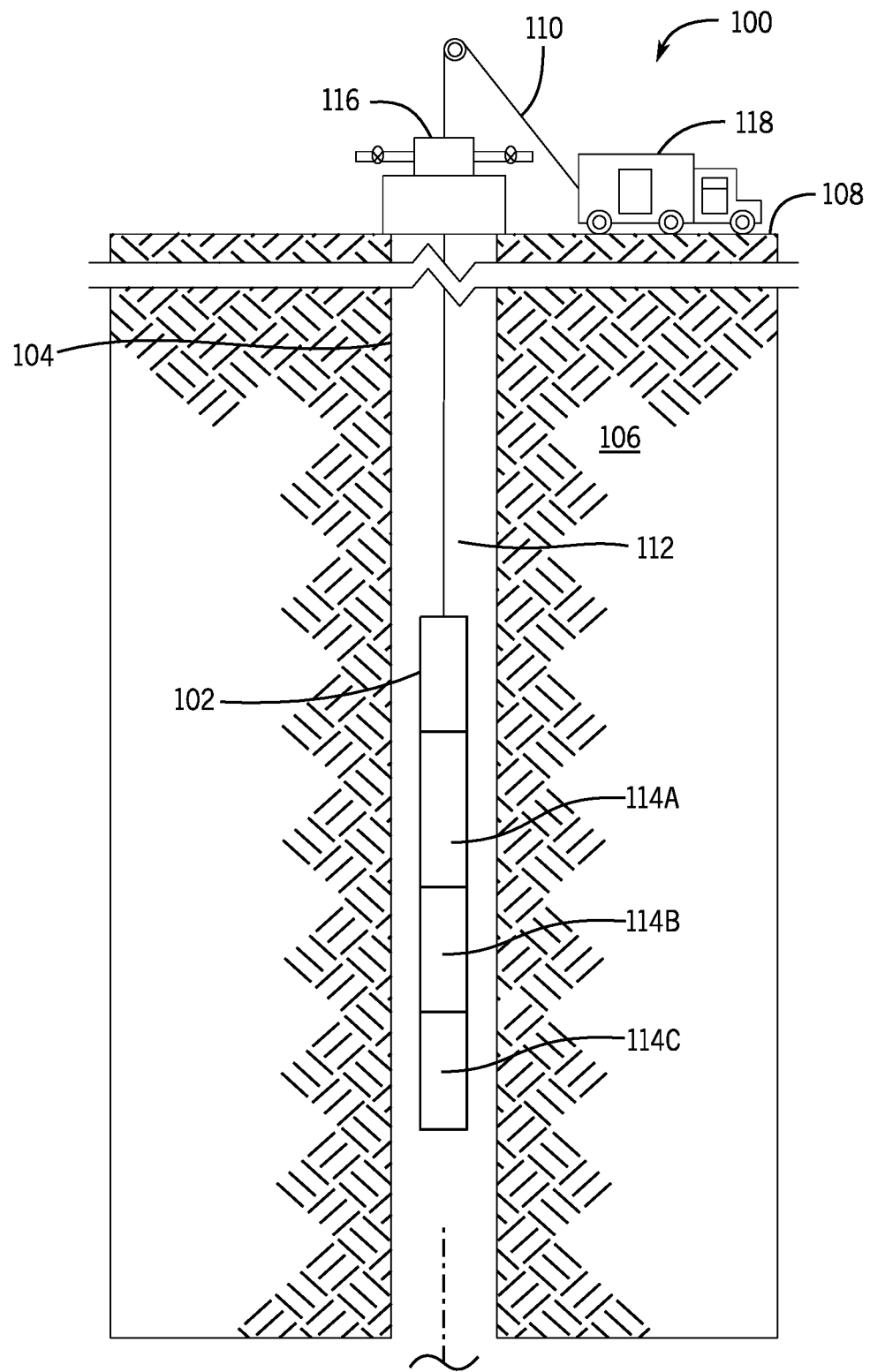
FIG. 1 illustrates an example environment subject to improvements of at least one embodiment herein.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. Various other functions can be implemented within the various embodiments as well as discussed and suggested elsewhere herein. In at least one aspect, the present disclosure is to a system and a method for analysis of a porous media, such as porous formations, including of porous materials.

In at least one embodiment, porous formations include naturally and unnaturally occurring materials having pores. For example, subterranean materials (such as, natural outcrops and subsurface formations), as well as three-dimensionally (3D) printed materials (such as, formations manufactured by using 3D printing technologies), both having pores, may be used as a basis for modeling (or sampling), as well as for testing. Subsequently, information attained from such testing may be used to gauge characteristics of a downhole porous formation presenting a natural downhole environment or representing materials used in downhole fluid environments.

Aspects of modeling or sampling performed for a synthetic model or porous formation (including its representations) may be used subsequently with production porous samples or a downhole environment that represent natural or unnatural materials having pores. Furthermore, homogenous or heterogeneous porous formations may be subject to a system and a method for analysis of a porous formations. This may be so that fluid flow and other characterizations (such as, petrophysical characterizations) of such porous formations may be established using modeling from a model or sample porous formation.

Naturally and unnaturally occurring materials having pores may be used as sample or modelling porous formation to form estimation models, which may be subsequently used to classify or characterize production porous formation, which may also be naturally or unnaturally occurring materials. Thereafter, artificial intelligence aspects disclosed herein allows use of classified or characterized production porous formations along with the sample or modelling porous formations to generate a further and more robust estimation model.

A production porous formation, also referred to as a downhole rock formation, is in reference to a porous formation under test using an estimation model in a downhole environment or laboratory, versus a modeling or sample porous formation (or a representation thereof) that is used to train or to establish the estimation models that are to be used in the test. Therefore, a production porous formation may be associated with a borehole (such as from oil extraction or water injection well projects) or may be associated with testing features in samples created for testing and for further evaluation that is not in a production environment.

In at least one embodiment, a system and method herein can address such deficiencies raised and noted throughout herein by including a downhole tool having one or more subsystems for application of electrical signals capable of permittivity measurements. Alternatively, a system and method herein can address such deficiencies raised and noted throughout herein by including a laboratory tool having one or more subsystems for application of electrical signals capable of permittivity measurements, including electromagnetic signals.

In at least one embodiment, a method is described herein to determine isolated and connected porosity from multi-frequency dielectric measurements. Such multi-frequency dielectric measurements, also referred to herein as dielectric property values, can include permittivity measurements associated with the porous formation and are determined from electrical signals provided to one or more of the porous formation or a representation of the porous formation. The dielectric property values can relate permittivity measurements and frequencies from the electrical signals for a porous formation or a representation of a porous formation. The dielectric property values can include a rate of permittivity change (RPC) and/or permittivity ratio (PR) determined from the multi-frequency dielectric measurements. This represents generation of a first estimation model that relates permittivity measurements and frequencies that are associated with electrical signals applied to sample or model porous formations.

A percentage of isolated and connected porosity, representing structural property values of the porous formation or the representation of the porous formation, may be determined using a further (or second) estimation model that relates such structural property values to the RPC and/or the PR for the porous formation or the representation of the porous formation. This second estimation model is, therefore, generated using the one or more dielectric property values.

The second estimation model may relate the RPC and/or the PR with porosities (such as connected and isolated porosities) for the porous formation or the representation of the porous formation, using a data analytics models (such as, curves, lines, and n-dimensional representations (where n>2)), a function, or an equation. The second estimation model from the porous formation or the representation of the porous formation can be used with a total porosity to determine a rock formation petrophysical property value for a downhole rock formation. That is, the modelling is applied to physical downhole environment. Further, such a total porosity may be determined from one or more of a Nuclear Magnetic Resonance (NMR) measurement, a bulk density measurement, or a neutron porosity measurement associated with the porous formation or the representation of the porous formation.

Therefore, the second estimation model provides structural property values associated with isolated and connected porosities of the porous formation or the representation of the porous formation. From the second estimation model and the total porosity, an amount of the isolated and connected porosity, representing a rock formation petrophysical property value for a downhole rock formation, may be determined.

The determination of the rock formation petrophysical property value for the downhole rock formation may be a percentage of connected porosity (PCP) for the downhole rock formation. The PCP can be determined using one or more of an RPC or a PR of the one or more dielectric property values and using the total porosity, a water saturation measurement, a temperature measurement, a water salinity measurement, a wettability measurement, and a mineralogy measurement for the porous formation or the representation of the porous formation.

Then, the rock formation petrophysical property value of the porous formation or the representation of the porous formation can be used to estimate or predict one or more of an isolated porosity or a connected porosity of the downhole rock formation. For example, the connected porosity of the downhole rock formation is determined using the total porosity and the PCP (such as a product of the two values), while the isolated porosity is determined using a difference of the total porosity and the connected porosity. A wellbore or testing operation may be enabled or performed based at least in part on the estimated or predicted isolated porosity or connected porosity of the downhole rock formation.

A method for analysis of isolated and connected porosities of a porous formation using permittivity is disclosed, where the method includes modeling the percentage of isolated and connected porosity with the RPC and/or PR for the porous formation or the representation of the porous formation. The modelling uses an equation, curve, or function to relate together the percentage of isolated and connected porosity with the RPC and/or PR.

In one example, a model or sample porous formation is used, where some aspects of the model or sample porous formations are known. For example, model or sample porous formations with various amount of connected porosity are artificially generated or created. These may be physical porous formations or representations. Multi-frequency dielectric measurements that include permittivity measurements may be determined for the model or sample porous formation. In at least one embodiment, a simulation porous formation represents a model porous formation and such a simulation porous formation may be prepared using sample (such as physical) porous formations. Such a simulation porous formation may therefore be a modeling or sample porous formation, but can also be used in a test as a production porous formation if it is used against an estimation model previously provided from one or more sample or model porous formations.

In at least one embodiment, the second estimation model includes equations that are provided to correlate the isolated and connected porosity with corresponding multi-frequency permittivity measurements. The equations may be a function of frequency, total porosity, fluid saturation, formation temperature, water salinity, pore structure, wettability, and mineralogy. In at least one embodiment, modelling or sampling porous formations may be used with random or initial porosity values to find relationships or associations between permittivity measurements in a test or training environment, which relationships or associations can be then used with new permittivity measurements of porous formations to account for the isolated and the connected pores in such porous formations.

In at least one embodiment, such a method and system can provide a simple non-destructive technique (distinct from thin-section techniques) for analysis or characterizing of porous formations, such as rock heterogeneity in a laboratory. Furthermore, such analysis or characterization can then inform an estimation model for estimating or predicting isolated and connected porosity that is useful to enhance reservoir characterization of heterogeneous carbonate reservoirs for downhole applications.

Characterization of heterogeneous carbonate reservoirs that may be otherwise challenging is due to intrinsic heterogeneities that occur at all scales of observations and measurements conducted for such features. Heterogeneity in carbonates may be attributed to pores with different shapes, origins, sizes, and degrees of pore connectivity. Pores in carbonates can be completely isolated or connected via very narrow pore throats. Based at least in part on an amount of such pores, petrophysical properties of carbonate reservoirs, such as permeability, may vary even if they have similar measured or observed porosity.

In at least one embodiment, FIG. 1 illustrates an example environment 100 subject to improvements described herein. In at least one embodiment, a laboratory environment may be suitable to perform all aspects of the present system and method. A system, such as for analysis of porous formations using permittivity from electrical signals, may include one or more downhole and/or platform-based tools 102. In at least one embodiment, a system such as for analysis of porous formations may include a laboratory setting where samples are provided in a lab, as also supported in the description associated with FIG. 9. In at least one embodiment, a platform-based tool may be above terrain surface 108 (of terrain 106) or above water surface. In at least one embodiment, such a downhole and/or platform-based tool 102 may be part of a string 112 of tools, which may include other components utilized for wellbore or testing operations.

In at least one embodiment, if used within a downhole tool, a string 112 of a downhole tool may include other tools 114A-114C than components or an entire chromatography system. In at least one embodiment, such tools may be part of sensors, measurement devices, communication devices, and the like. In at least one embodiment, a string 112 may include one or more tools to enable at least one wellbore or testing operation, including a laboratory operation, a logging operation (such as dielectric logging logging), a perforating operation, or well intervention. In at least one embodiment, nuclear logging tools, fluid sampling tools, and core sampling devices may be also used in a string 112. In at least one embodiment, such one or more tools may include part of or a complete subsystem to perform functions described throughout herein.

In at least one embodiment, perforating operations may include ballistic devices being lowered into a wellbore 104 to perforate casing or the formation. In at least one embodiment, well interventions may include operations relating to analysis of one or more features of a wellbore 104, followed by performing one or more tasks in response to at least one feature. In at least one embodiment, one or more features may include data acquisition, cutting, and cleaning. As such, in at least one embodiment, a string 112 may refer to a combination of one or more tools lowered into a wellbore 104. In at least one embodiment, passive devices may also be included, such as centralizers or stabilizers. In at least one embodiment, tractors may be provided to facilitate movement of a string 112.

In at least one embodiment, power and/or data conducting tools may be used to send and receive signals and/or electrical power. In at least one embodiment, sensors may be incorporated into various components of a string 112 and may be enabled to communicate with a surface (platform) or with other string components. In at least one embodiment, such communication may be via a cable 110, via mud pulse telemetry, via wireless communications, and via wired drill pipe, in a non-limiting manner. In at least one embodiment, it should be appreciated that while embodiments may include a wireline system, a rigid drill pipe, coiled tubing, or any other downhole exploration and production methods may be utilized with at least one embodiment herein.

In at least one embodiment, an environment 100 includes a wellhead assembly 116 shown at an opening of a wellbore 104 to provide pressure control of a wellbore and to allow for passage of equipment into a wellbore 104. In at least one embodiment, such equipment may include a cable 110 and a string 112 of tools. In at least one embodiment, a cable 110 is or may include a wireline that is spooled from a service truck 118. In at least one embodiment, a cable 110 may extend to an end of a string 112. In at least one embodiment, during operation, a cable 110 may be provided with some slack as a string 112 is lowered into a wellbore 104 to a predetermined depth.

In at least one embodiment, fluid may be delivered into a wellbore 104 to drive or assist in movement of a string 112. In at least one embodiment, this may be a case where gravity may not be sufficient to assist, such as in a deviated wellbore. In at least one embodiment, a fluid pumping system may be provided at a surface 108 to pump fluid from a source into a wellbore 104 via a supply line or conduit. In at least one embodiment, control of a rate of travel of a downhole assembly and/or control of tension on a wireline 110 may be provided by a winch on a surface 108. In at least one embodiment, such a winch system may be part of a service tuck 118. In at least one embodiment, a combination of fluid flow rate and tension on a wireline 110 can contribute to a travel rate or rate of penetration of a string 112 into a wellbore 104.

In at least one embodiment, a provided cable 110 may be an armored cable that includes conductors for supplying electrical energy (power) to downhole devices and communication links for providing two-way communication between a downhole tool and surface devices. In at least one embodiment, tools such as tractors, may be disposed along a string 112 to facilitate movement of such a string 112 into a wellbore 104. In at least one embodiment, a string 112 may be retrieved from a wellbore 104 by reeling a provided cable 110 upwards using such a service truck 118. In at least one embodiment, logging operations may be performed as a string 112 is brought to a surface 108.

In at least one embodiment, a system of a downhole tool 102 can include a wireline system for analysis of a porous formation using permittivity that is entirely in the downhole environment or partly in the downhole environment and partly on the surface. In at least one embodiment, wireline logging tools are able to evaluate a porous formation using permittivity in a downhole environment or is able to retrieve samples or production-quality porous formations for a surface analysis of such porous formation.

Figure 2:
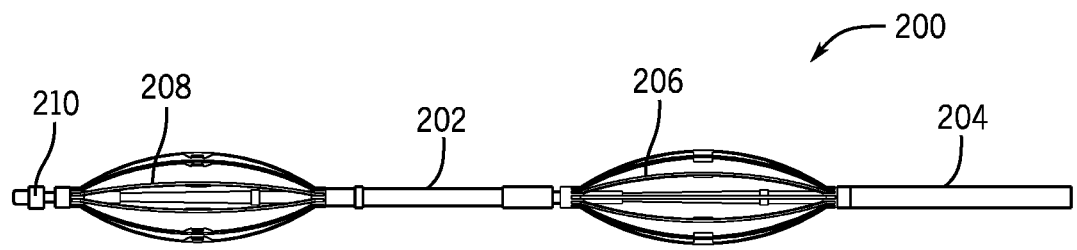
FIG. 2 illustrates a downhole tool that can include a wireline system for analysis of a porous formation using permittivity that is partly in the downhole environment and partly on the surface, or fully in the downhole environment.

FIG. 2 illustrates a downhole tool 200 that can include a wireline system for analysis of a porous formation that is partly in the downhole environment and partly on the surface, or fully in the downhole environment. FIG. 2 may be taken as an illustration of a test tool 200 subject to improvements disclosed herein, in accordance with various embodiments. A tool 200 can include a downhole instrument 202 with compartments for a temperature sensor 204, a spinner array 206, a wireline system 208 for analysis of a porous formation, and resistance array 210. At least some of these components may be used to collectively provide capability to perform analysis of a porous formation using permittivity from a downhole application. A wireline system 208 for analysis of a porous formation using permittivity may be coupled to an above-ground or surface subsystem, such as at least one processor executing instructions from a memory to perform multiple functions, for instance. As such, the wireline system may be a subsystem that works with the above-ground or surface subsystem.

Figure 3:
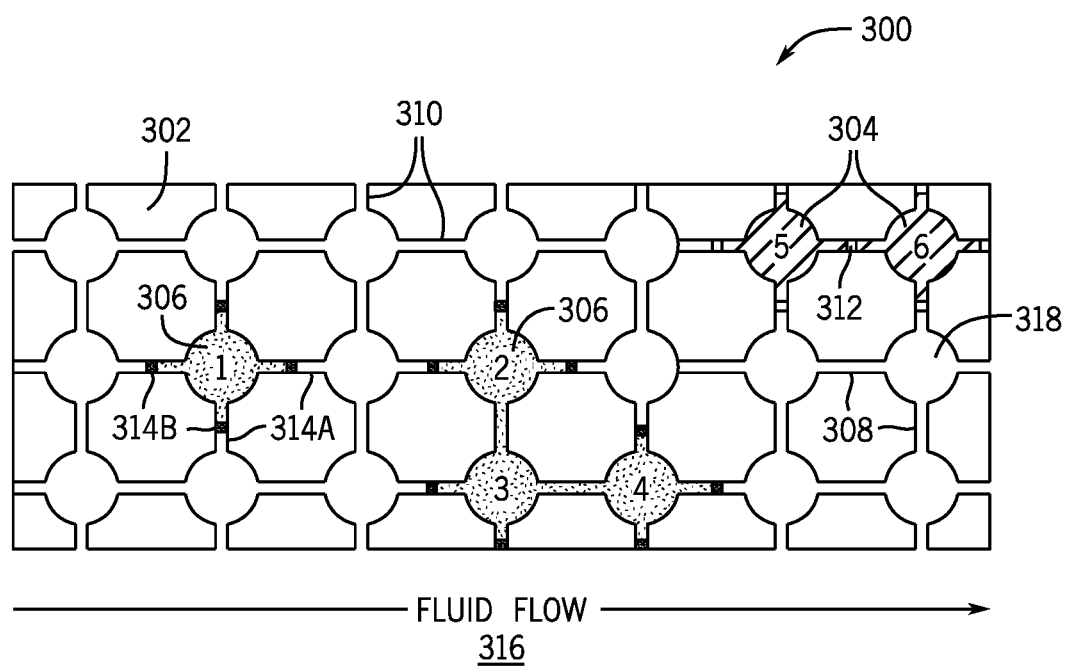
FIG. 3 illustrates a porous medium or formation that may include a solid matrix and void (or pore) space and that may be subject to analysis using permittivity measures as described herein, in at least one embodiment.

In at least one embodiment, FIG. 3 illustrates a porous medium or formation (such as, a subsurface formation that is natural or a lab-generated and unnatural formation) that may include a solid (even if porous) matrix 302 and void (or pore) space 304, 306, 318 and that may be subject to analysis using permittivity measures as described herein. A network or matrix 302 of pores 304, 306, 318 of a porous formation includes connected pores 318 and isolated pores 304 (and to an extent, 306), in at least one embodiment. In FIG. 3, a porous formation 300 may be a simulated, physical, or representation of a porous formation that may be used to generate estimation models described throughout herein. In at least one embodiment, however, such a porous formation 300 may be representative of a production porous formation, albeit with less uniformity that is provided for illustrative purposes herein.

A porous formation 300 includes a matrix or network 302 of void (or pore) spaces 304, 306, 318. Such a porous formation 300 also includes throats 314A that may be completely blocked by natural or other formations or blockages 314B. Further, such a porous formation may also include throats 312 that are relatively small with respect to throats 308 that are fully open and are considered to be large throats. In at least one embodiment, small and large throats are relative terms that may be adjusted according to a determination of throat size variations from a sample, with pores above a certain determined value (such as, by cross-section area or diameter) taken to be larger pores and pores below such a determined value taken to be smaller pores. Blocked throats 314A of certain pores 306 (referred to as blocked or isolated pores) may have no dimension (or would have a 0 dimension) to contribute to the determination across throat size variations.

In at least one embodiment, isolated pores may be, therefore, those pores 306 (such as pore 1, or a cluster of pores 2, 3, 4) that are completely disconnected or blocked from all of its neighboring pores via such blocked throats or other basis, such as no throats to connect to other pores (such as, pore 1 and cluster of pores 2, 3, 4 in FIG. 3, even though blockages 314B are not illustrated for all these pores 2, 3, and 4).

In at least one embodiment, some pores 304 may connect to its neighboring pores 304 via narrow pore throats 312. A size (diameter or area) of such a pore throat 312, given by $d_{PT}$ may be smaller than a determined or threshold value (also referred to as critical size), that may be given by $d_{PT,c}$ (such as, pore 5 and 6).

In at least one embodiment, connected pores may refer to those pores 318 that connect to a network of other connected pores 318, in which fluid can flow 316 through the porous formation 300 from one end (such as, a left side in FIG. 3) of the porous formation 300 to the other end (such as, to the right side of FIG. 3 through one or more connected pores 318 illustrated without shading). In at least one embodiment, such a flow may represent a fluid flow from a reservoir to a borehole.

Figure 4A:
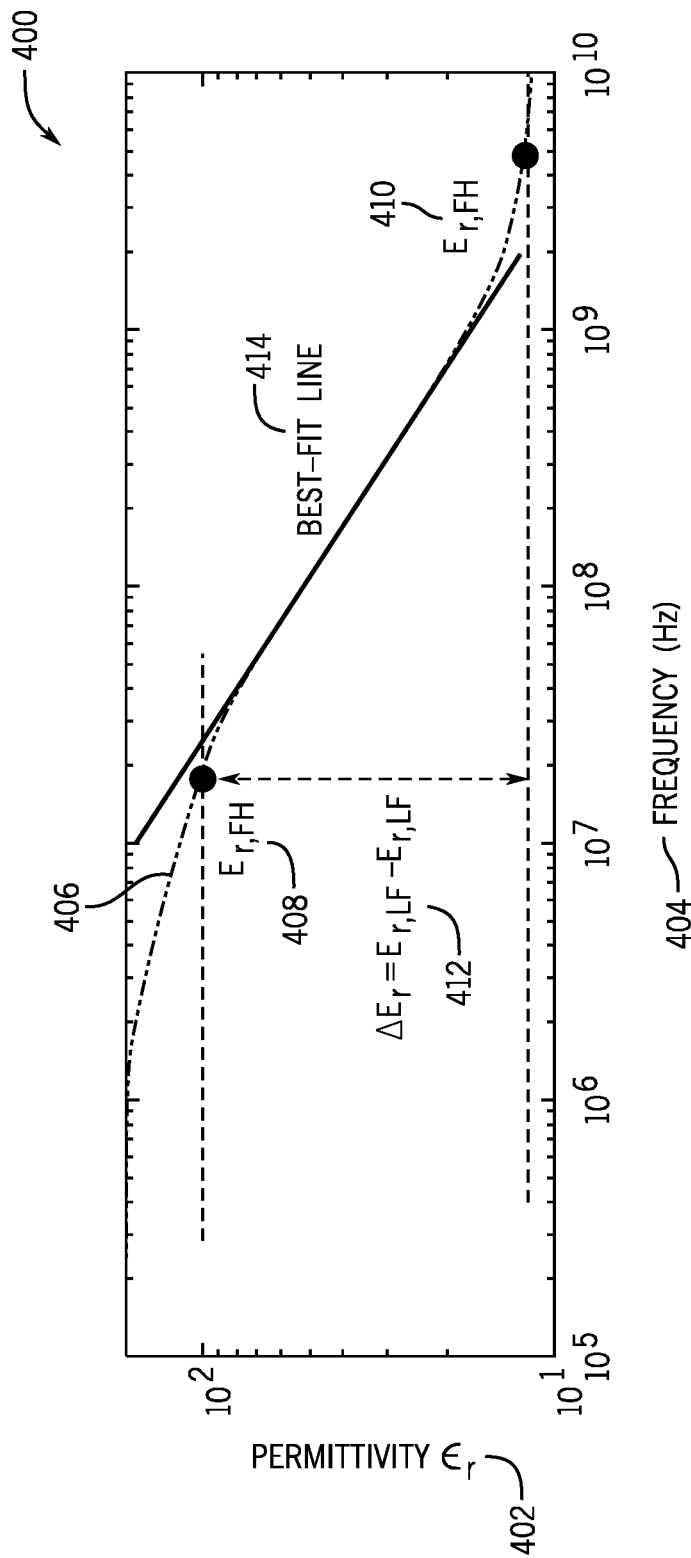
FIGS. 4A-4C illustrate aspects of using permittivity measures determined from multi-frequency dielectric measurements, along with frequency, to provide a first estimation model for estimating or predicting one or more of an isolated porosity or a connected porosity of a production porous formation, according to at least one embodiment.
Figure 4B:
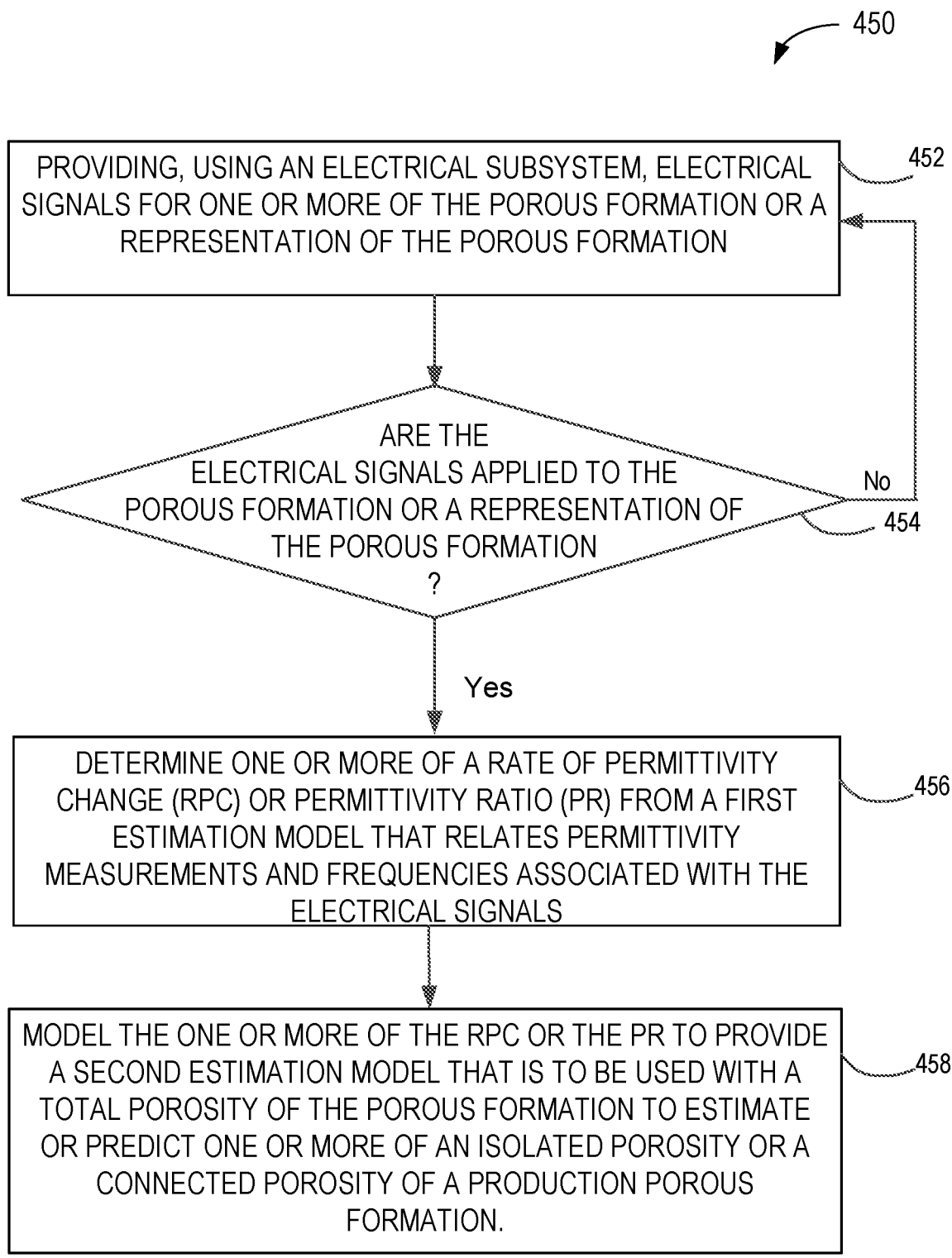
Figure 4C:
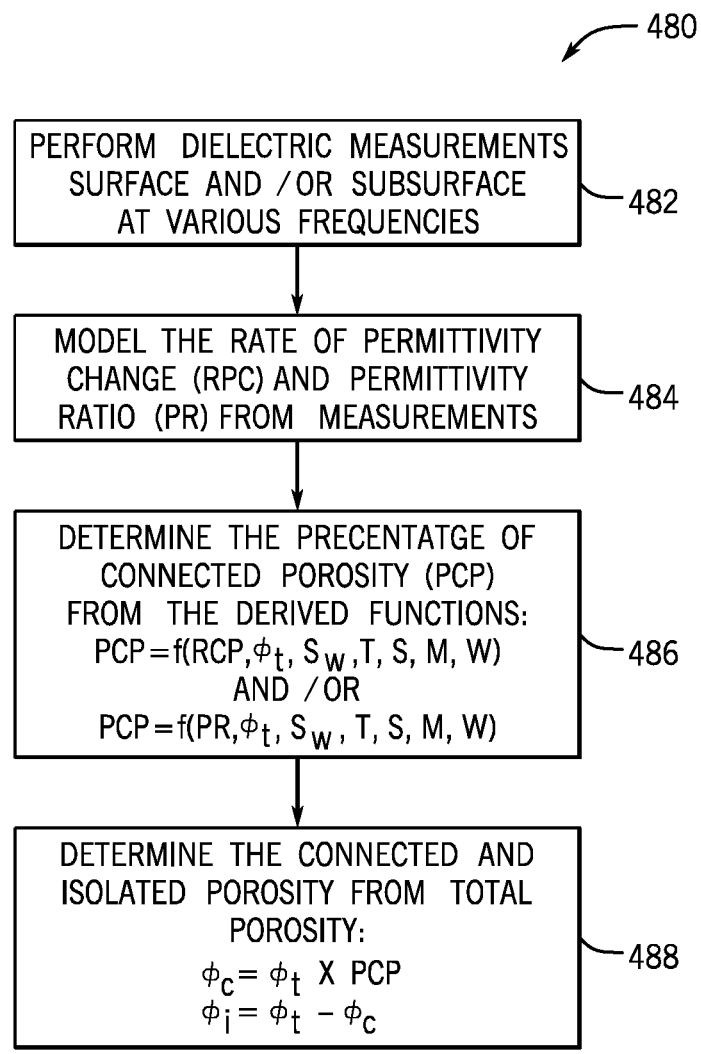

FIGS. 4A-4C illustrate aspects 400, 450, 480 of using dielectric constant (representing permittivity 402) determined from multi-frequency dielectric measurements, along with frequency 404, to provide a first estimation model. The first estimation model may be used in estimating or predicting one or more of an isolated porosity or a connected porosity of a production porous formation, according to at least one embodiment. For example, electrical signals for an electric field may be applied to different surface positions of a sample or model porous formation, and similarly to a subsurface porous formation.

A first estimation model may be a curve 406 having a best-fit line (or curve) 414, but may alternatively be the best-fit line 414. An equation representing the best-fit (that is a line or curve) 414 may be the first estimation model. As such, aspects 400 in FIG. 4A enables determination of one or more of a rate of permittivity change (RPC) or permittivity ratio (PR) from a first estimation model 406 that relates permittivity measurements 402 and frequencies 404 that are associated with the electrical signals. For example, permittivity values are plotted against different frequencies for electrical signals applied.

In at least one embodiment, total porosity ($\phi_t$) may be separately determined. Total porosity may be taken as a ratio of a total amount of pore volume (connected plus isolated pores) to a bulk volume (such as, a volume of matrix plus a volume of void space). The total porosity may be determined from one or more of a Nuclear Magnetic Resonance (NMR) measurement, a bulk density measurement, or a neutron porosity measurement associated with the porous formation.

Further, connected porosity ($\phi_c$) may be taken as a ratio of an amount of connected pore volume ($d_{PT} \geq d_{PT,c}$) to the bulk volume. Still further, isolated porosity ($\phi_i$) may be taken as a ratio of an amount of isolated pore volume ($d_{PT} < d_{PT,c}$) to a bulk volume (such that $\phi_i = \phi_t - \phi_c$). A percentage of connected porosity (or connected pores) (PCP) may be taken as the percentage of porosity (or pores) which are connected:

$$PCP = \frac{\phi_c}{\phi_t} \times 100\%. \qquad \text{Equation (1)}$$

The extent and connectivity of a pore structure in a porous formation can control fluid flow and transport through a porous formation. As such, isolated pores can contribute to a total porosity (fluid storage capacity), while they may be incapable of transmitting fluids through a porous formation. Presently, it is beneficial to quantify an amount of connected (or isolated) pores (or porosity) for reservoir characterization, for reserve and productivity evaluation, and for hydrocarbon recovery. The system and method herein can quantify connected and isolated porosity of porous formations using permittivity from multi-frequency dielectric measurements and a total porosity that can be determined from other measurements (such as, by using Nuclear Magnetic Resonance (NMR) measurement, bulk density, and/or neutron porosity measurements).

A dielectric constant or permittivity may be taken as a measure of electrical polarizability of a material. The relative dielectric permittivity, or dielectric constant $\varepsilon_r(\omega)$, of a porous medium is its permittivity expressed as a ratio relative to permittivity of vacuum:

$$\varepsilon_r(\omega) = \frac{\varepsilon(\omega)}{\varepsilon_0}. \qquad \text{Equation (2)}$$

In Equation (2), $\varepsilon(\omega)$ is a complex frequency-dependent permittivity of a material, $\varepsilon_0$ is vacuum permittivity, and $\omega$ is an angular frequency, where $\omega = 2\pi f$, where f is a frequency of an external electric field applied as part of the electrical signals.

Relative permittivity is a complex function having the real and imaginary components and can be expressed as:

$$\varepsilon_r(\omega) = \varepsilon_r'(\omega) - i \frac{\sigma(\omega)}{\omega \varepsilon_0}. \qquad \text{Equation (3)}$$

In Equation (3), i is an imaginary number and $\sigma(\omega)$ is an electrical conductivity (having unit mS/m or Siemens per meter). The real portion of dielectric permittivity is the ratio of the electric-field storage capacity of a material to that of free space. The imaginary portion of dielectric permittivity is usually expressed as dielectric loss, which represents attenuation and dispersion.

Dielectric loss is negligible if conductivity of a material is low, such as, less than ~10 mS/m. This may be the case with many geologic materials. As such, a dielectric constant may be taken as substantially the real component of the dielectric permittivity. As such, herein, dielectric permittivity or dielectric constant represents a real component of a relative dielectric permittivity, which may be denoted as $\varepsilon_r$.

The dielectric constant can depend upon a variety of factors, such as frequency, total porosity, fluid saturation, water salinity, temperature, mineralogy, wettability, and pore structure. Certain factors, in determining dielectric permittivity of a porous formation may include total porosity, water saturation, and pore structure. The dielectric constant may generally decrease with an increase in frequency. Moreover, conductivity and dielectric loss may increase with such increasing frequency. Further, dielectric dispersion is a dependence of permittivity of a porous formation on a frequency of an applied electric field as part of electrical signals for generating the estimation models or for testing porous formations. The effect of the connected porosity on dielectric dispersion can be, therefore, used to determine the connected porosity from dielectric permittivity measurements.

In at least one embodiment, a system and method herein may be used to determine isolated and connected porosities of a porous formation from permittivity measures of dielectric measurements associated with electrical signals provided to a sample or model porous formation or to its representation. The dielectric permittivity $\varepsilon_r$ may be modeled in a first estimation model from the permittivity measures and from frequencies, using electrical signals (associated with the frequencies) applied to a surface of a porous formation that is either within a laboratory, at a field, or in a subsurface (downhole) environment. The frequency of a field created by such electrical signals may be used as a reference to model the permittivity measures.

FIG. 4A illustrates a first estimation model from permittivity measurements 402 and frequencies 404, where the first estimation model is in the form of a multi-frequency dielectric permittivity curve 406. A porous formation or its representation has a determined porosity (such as a known total porosity) that may be used to provide permittivity measures under different frequencies. The rate of permittivity change (RPC) may be determined from the slope of the best-fit line 414 of the curve 406 at a given frequency interval between ($\varepsilon_{r,LF}$) 408 and ($\varepsilon_{r,HF}$) 410. The curve 406 may be plotted in a log-log plot, as illustrated in FIG. 4A. The permittivity ratio (PR) is defined as the ratio of the permittivity difference 412 at two determined frequencies 408, 410 to the permittivity at a higher of the two different frequencies (or relative to both of the two different frequencies):

$$PR = \frac{\varepsilon_{r,LF} - \varepsilon_{r,HF}}{\varepsilon_{r,HF}}. \qquad \text{Equation (4)}$$

As such, the LF and HF of Equation (4) represent points of low frequency and high frequency, respectively, from which corresponding permittivity values may be used for the PR and the RPC.

FIG. 4B illustrates a workflow 450, in at least one embodiment, of a method for analysis of isolated and connected porosities of a porous formation using permittivity. The method includes a step 452 for providing, using an electrical subsystem, electrical signals for one or more of the porous formation or a representation of the porous formation. Step 454 is for determining if the electrical signals are applied to the porous formation or a representation of the porous formation. Step 452 may be repeated to ensure that the signals from step 452 are provided. Steps 456, 458 may be performed using a processor.

A step 456 of the method, caused by at least one processor that executes instructions from a memory, is to determine one or more dielectric property values that relate permittivity measurements and frequencies from the electrical signals. Such a determination is for one or more of a rate of permittivity change (RPC) or permittivity ratio (PR) from a first estimation model that relates permittivity measurements and frequencies that are associated with the electrical signals.

A further step 458 of the method, caused by at least one processor that executes instructions from a memory, is to generate a second estimation model using the one or more dielectric property values. The second estimation model provides structural property values associated with isolated and connected porosities of the porous formation or the representation of the porous formation. For example, the second estimation model is generated using one or more of the RPC or the PR, and its association to isolated and connected porosities of the porous formation or the representation of the porous formation, which may be known structural property values. The second estimation model, along with a total porosity of the porous formation or representation of the porous formation, can be used to determine a rock formation petrophysical property value, such as the PCP, for porous formation or the representation of the porous formation. Then the rock formation petrophysical property value can be used to estimate or predict one or more of an isolated porosity or a connected porosity of a porous formation (such as a downhole rock formation).

FIG. 4C illustrates a further workflow 480, in at least one embodiment, of another method for analysis of isolated and connected porosities of a porous formation using permittivity. Step 482 is for performing dielectric measurements (representing permittivity) for model or sample porous formations in a surface or in a subsurface environment using electrical signals at different frequencies. For example, an electric field associated with the electrical signals may be formed between ends or sides of a porous formation. Frequencies associated with the electric field may be adjusted before permittivity measurements are taken.

Step 484 is to generated the second estimation model of a rate of permittivity change (RPC) and/or permittivity ratio (PR) from the permittivity versus frequency curves of a first estimation model that relates the permittivity measurements and the frequencies that are associated with the electrical signals. Steps 482 and 484 represent a splitting of aspects performed by a singular step 456 of FIG. 4B. Step 486 is then performed to determine a percentage of connected porosity (PCP) from one or more models that may be represented as:

$$PCP = f(RPC, \phi_t, S_w, T, S, W, M) \quad \text{Equation (5).}$$

$$PCP = f(PR, \phi_t, S_w, T, S, W, M) \quad \text{Equation (6).}$$

In Equations (5) and (6), $\phi_t$ is total porosity, $S_w$ is water saturation, T is temperature, S is water salinity, W is wettability, and M is mineralogy. Each of these values may be determined from other measurements conducted in a standard manner for the one or more models (porous formations or representations of the porous formations).

Step 488 is to determine the connected and/or isolated porosity, which are taken as:

$$\phi_c = \phi_t \times PCP \quad \text{Equation (7).}$$

$$\phi_i = \phi_t - \phi_c \quad \text{Equation (8).}$$

At least Equations (5) and (6) represent second estimation models of the isolated and connected porosities that may be taken from the PCP value and represent second estimation models having one or more of the RPC or the PR. Even though the isolated and connected porosities are determined using PCP and the total porosity, one or more of the RPC or the PR are modelled via these Equations (5) and (6) to provide a second estimation model. The second estimation model provides a PCP value that may be used with a total porosity to determine rock formation petrophysical property value for porous formation or the representation of the porous formation. This rock formation petrophysical property is used to estimate or predict the isolated and connected porosities for the downhole rock formation. As such, the second estimation model is associated with isolated and connected porosities for the porous formation.

A further step may be included in the workflow 480 of FIG. 4C, for use of the second estimation model with a total porosity of the porous formation to estimate or predict one or more of an isolated porosity or a connected porosity of a production porous formation. For example, using the rock formation petrophysical property that includes the PCP value, the isolated and connected porosities of a downhole rock formation may be estimated or predicted. Steps 486 and 488 may be performed together by a consolidated step 458 in the workflow 450 of FIG. 4B. The further step of using the second estimation model for a porous formation may also be within consolidated step 458 in the workflow 450 of FIG. 4B.

Figure 4D:
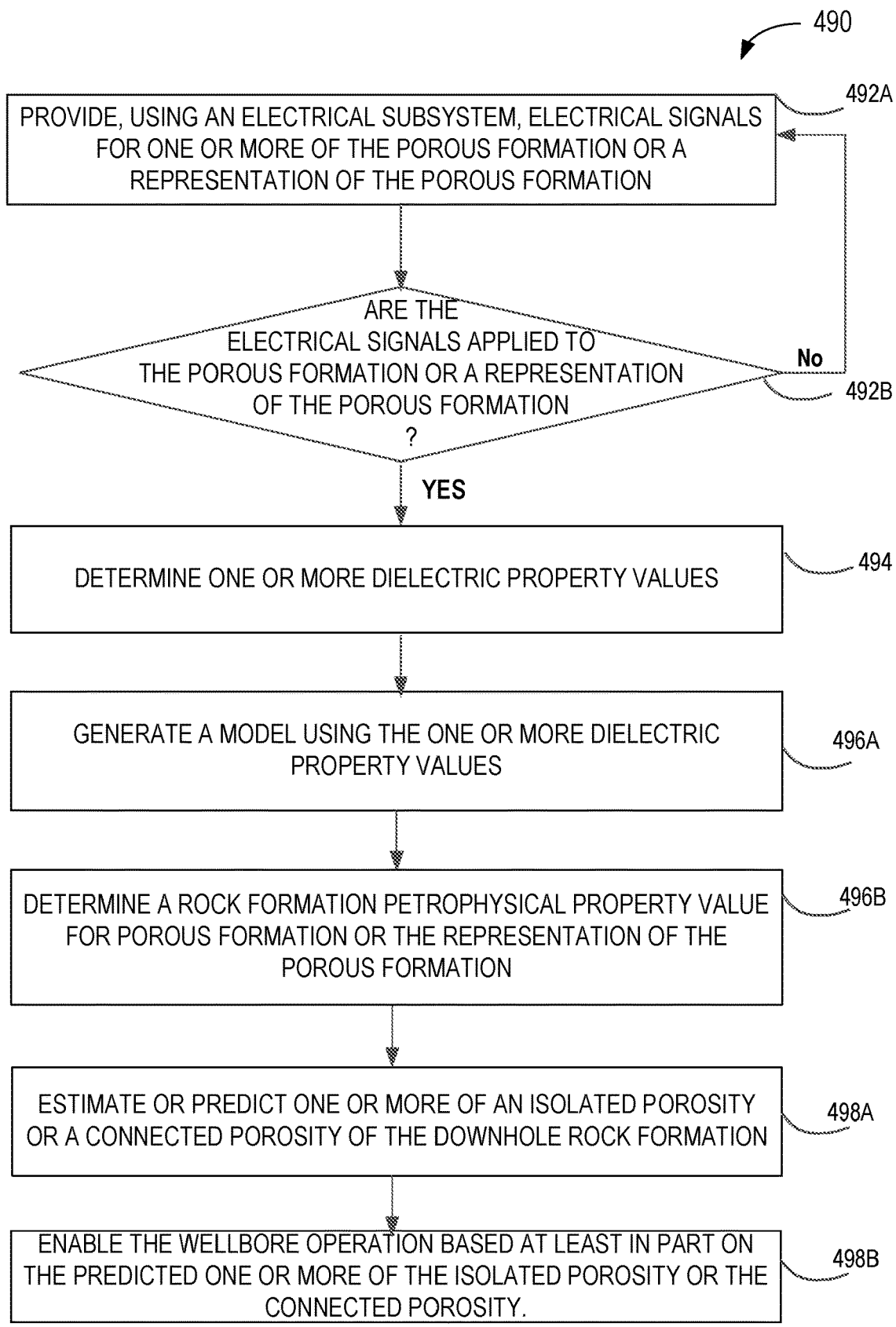
FIG. 4D illustrates a method for wellbore or testing operations, according to at least one embodiment.

FIG. 4D illustrates a method 490 for wellbore or testing operations, according to at least one embodiment. The method 490 includes providing (492A), using an electrical subsystem, electrical signals for one or more of the porous formation or a representation of the porous formation. The method includes verifying (492B) that the electrical signals are applied. Further, a step for determinations (494), by a processor, is performed for one or more dielectric property values that relate permittivity measurements and frequencies from the electrical signals. This relationship is represented in a first estimation model.

The method 490 includes generating (496A), by the processor, a model, such as a second estimation mode, using the one or more dielectric property values. The model provides structural property values associated with isolated and connected porosities of the porous formation or the representation of the porous formation. The method 490 includes determining (496B) a rock formation petrophysical property value for porous formation or the representation of the porous formation using the model and using a total porosity of the porous formation or the representation of the porous formation. The method 490 further includes estimating or predicting (496A) one or more of an isolated porosity or a connected porosity of the downhole rock formation based at least on the rock formation petrophysical property value. A further step in the method is for performing (498B) the wellbore or testing operation based at least in part on the estimated or predicted one or more of the isolated porosity or the connected porosity of the downhole rock formation.

The method 490 may include a further step or sub-step in which the one or more dielectric property values is a rate of permittivity change (RPC) or permittivity ratio (PR). The method 490 may include a further step or sub-step in which the RPC is a slope of the best-fit at a determined frequency interval of the curve and in which the PR is a ratio of a first permittivity value and a second permittivity value of the permittivity measures. The first permittivity value is a difference of two permittivity measures taken at two determined frequencies of the curve, and the second permittivity value is a permittivity at a third determined frequency that is higher than the two determined frequencies.

The method 490 may include a further step or sub-step in which the total porosity is one or more of a Nuclear Magnetic Resonance (NMR) measurement, a bulk density measurement, or a neutron porosity measurement associated with the porous formation. The method 490 may include a further step or sub-step in which the connected porosity of the downhole rock formation is determined using the total porosity and a percentage of the connected porosity (PCP) of the rock formation petrophysical property value.

The method 490 may include a further step or sub-step in which the PCP is determined using one or more of an RPC or a PR of the one or more dielectric property values and using the total porosity, a water saturation measurement, a temperature measurement, a water salinity measurement, a wettability measurement, and a mineralogy measurement for the porous formation or the representation of the porous formation.

The method 490 may include a further step or sub-step in which the isolated porosity is determined using a difference of the total porosity and the connected porosity. The method 490 may include a further step or sub-step in which the representation of the porous formation includes one or more of a synthetic model from a random sphere pack or includes a computerized tomography (CT) image from a reservoir rock.

The method 490 may include a further step or sub-step in which the porous formation or the representation of the porous formation utilizes two samples that are taken alone or as a combination. A first of the two samples has a determined porosity and a second of the two samples has a determined PCP. Further, the determined porosity and the determined PCP are combined to create the porous formation or the representation of the porous formation.

Figure 5A:
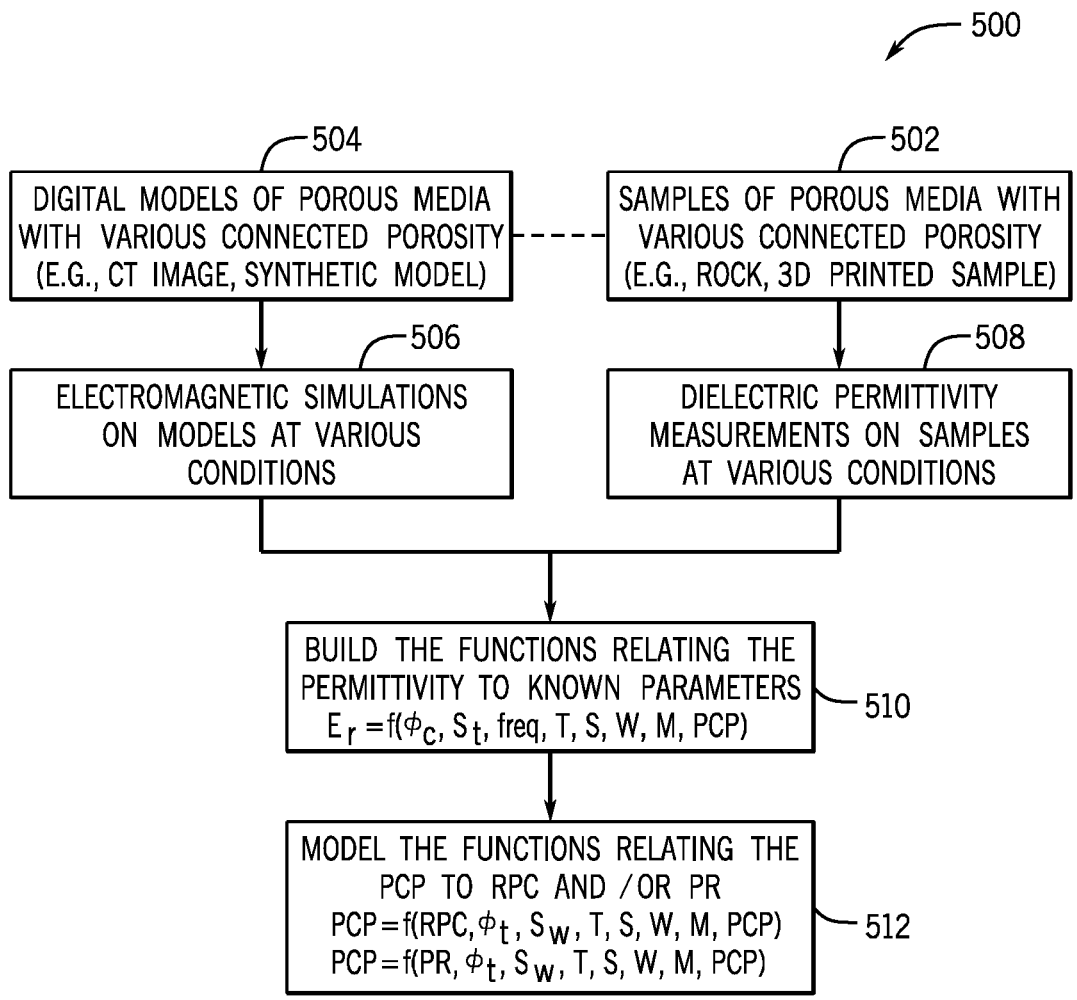
FIGS. 5A and 5B illustrate aspects of using dielectric constant (of the permittivity measures) for a porous formations or its representation, along with frequency, to provide a first estimation model for estimating or predicting one or more of an isolated porosity or a connected porosity of a production porous formation, according to at least one embodiment.
Figure 5B:
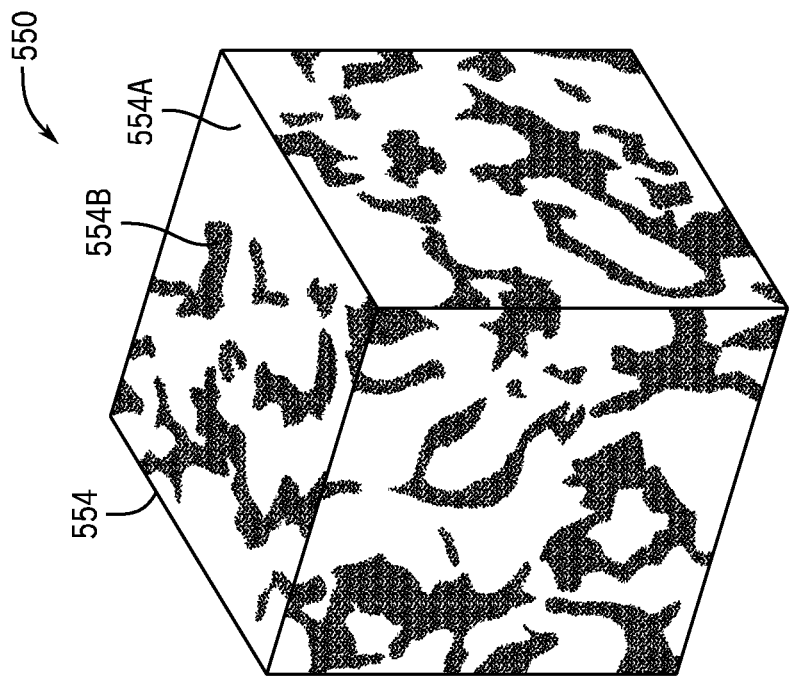
Figure 5B:
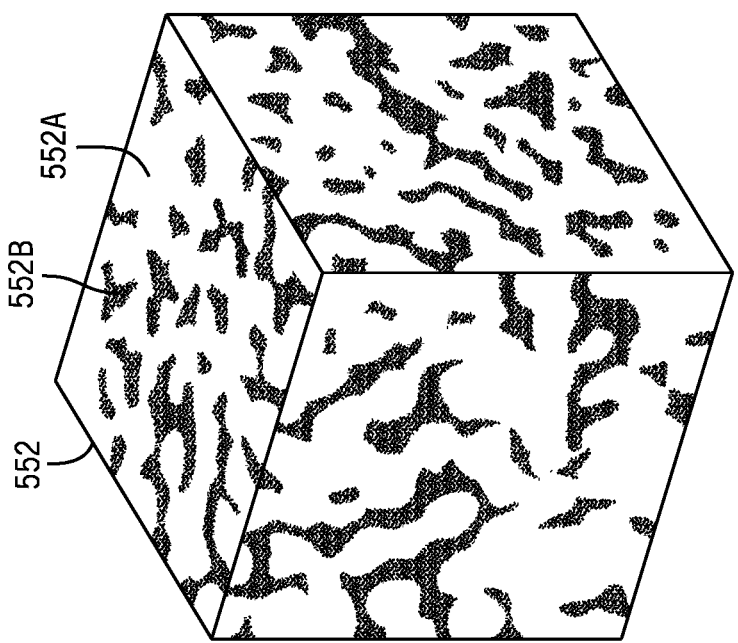

FIGS. 5A, 5B illustrate aspects 500, 550 of using dielectric constant (part of the permittivity measures) for a porous formation or its representation, along with frequency, to provide a first estimation model for estimating or predicting one or more of an isolated porosity or a connected porosity of a production porous formation, according to at least one embodiment. The workflow 500 in FIG. 5A includes steps of using a combination of a model or sample form of porous formation (such as, a rock or a 3-dimensional printed sample) and a representation form of a porous formation (such as a computer tomography (CT) image or a synthetic model).

In at least one embodiment, an electrical subsystem can provide electrical signals for one or more of the porous formation or a representation of the porous formation. As the porous formation is in a representation format, it is understood that the electrical signals for such a format are provided in a manner that can be used for such a format, including as digital signals.

Step 502 of workflow 500 is for using samples of porous media with various connected porosity that may be determined (such as using a known value) for purposes of training one or more estimation models that can be used later for testing porous samples. Step 504 is for, alternatively or together with the step 502, using digital models (forming representations) of porous formations or media with various connected porosity built-in.

Step 506 is for electrical signals may be therefore in electromagnetic form to provide permittivity measures at different frequencies for the representations. Concurrently or subsequently, step 508 is for electrical signals for the physical sample or model of a porous formation to provide permittivity measures at different frequencies for the physical sample or model of a porous formation.

Step 510 is directed to providing first estimation models (or a combined first estimation model) having one or more of a rate of permittivity change (RPC) or permittivity ratio (PR) so that the first estimation model(s) relate permittivity measurements and frequencies that are associated with the electrical signals. The first estimation model may include further parameters that are determined parameters (such as using known values), such as $\phi_t$ (total porosity), $S_w$ (water saturation), T (temperature), S (water salinity), W (wettability), and M (mineralogy). Step 510 may include modeling a percentage of connected porosity (PCP) as a function of the RPC or the PR, and that may include the other determined parameters.

Step 512 is directed to modeling the one or more of the RPC or the PR to provide a second estimation model. For example, the second estimation model may include functions, equations, or data analytics models from Equations (5) and (6) previously described herein. The second estimation model is, therefore, associated with the isolated and connected porosities because such isolated and connected porosities may be drawn from the PCP and total porosity, as described with respect to Equations (7) and (8). Workflow 500 may include a further step of using the second estimation model with a total porosity of the downhole rock formation to estimate or predict one or more of an isolated porosity or a connected porosity of the porous formation or the downhole rock formation.

FIG. 5B illustrates aspects 550 of different representations that may be used in Step 504 of workflow 500. As an example, representations of porous formations may include multiple digital models. A first digital model 552 may be a synthetic model created from a random sphere pack. A second digital model 554 may be a CT image from a reservoir rock. In at least one embodiment, in each of these digital modes 552, 554, there is a determined or known porosity. For example, a determined or known porosity may be established at 20% using information associated with materials forming a model or sample porous formation or from other tests applied to such porous formations.

The porosity may be representative of well-connected pores, but the digital models may be representative of a known or determined percentage of connected porosity (PCP). For example, a PCP may be at 100%. The two digital models may be then processed to generate other models with different amounts of connected porosity, and the workflow 504-512 may be performed with these other models to create robust estimation models. The digital models 552, 5554 also illustrate having solid structure 552A, 554A with pores or voids 552B, 554B therebetween.

Figure 6:
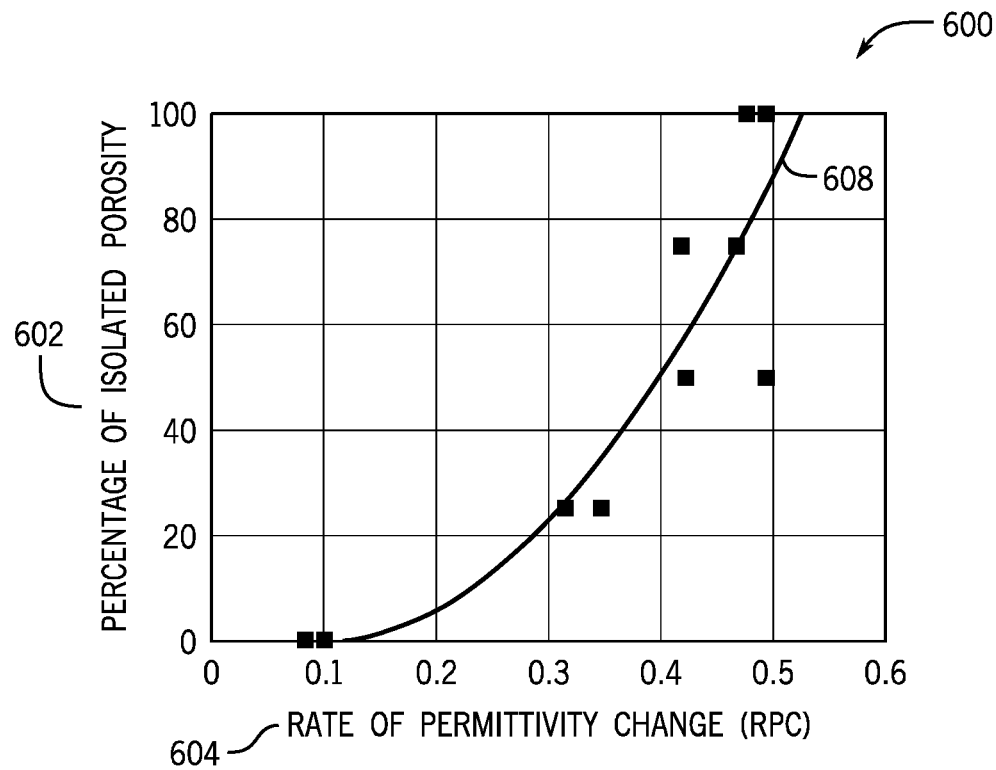
FIG. 6 illustrates modeling one or more of a rate of permittivity change (RPC) or a permittivity ratio (PR), using linear, power, polynomials, or other functions for a second estimation model, according to at least one embodiment.
Figure 6:
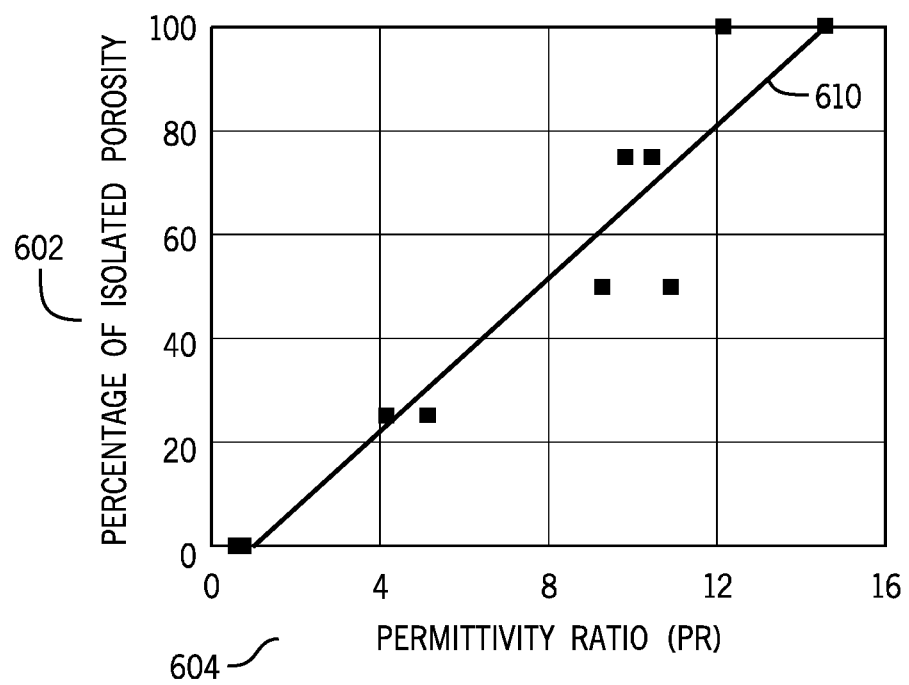

FIG. 6 illustrates modeling one or more of RPC 604 or PR 606, using at least linear (610) and power (608) functions for a second estimation model 600, according to at least one embodiment. The functions 608, 610 relate at least a percentage of isolated porosity to an RPC and/or PR for one or more of the two representations in FIG. 5B. From the isolated porosity and a known or determined total porosity, Equation (8) may be used to find the connected porosity. Further, the connected porosity may be used with the total porosity to find the PCP. The PCP may be then modeled with the RPC and/or PR, using functions that may be mathematically taken as:

$$PCP=100-(A_1 \cdot RPC^2+B_1 \cdot RPC+C_1) \quad \text{Equation (9).}$$

$$PCP=100-(B_2 \cdot PR+C_2) \quad \text{Equation (10).}$$

In Equations (9) and (10), $A_1$, $B_1$, $C_1$, $B_2$, $C_2$ are constants for the respective estimation models, but may be changed during each training performed for a second estimation mode, for instance. Other types of equations, including polynomials may be provided as second estimation models. The second estimation model may include the curves 608, 610, and may include the Equations (7) and (8) to find PCP, along with Equations (9) and (10) that relate RPC or the PR to provide a second estimation model associated with the isolated and connected porosities.

Values for $A_1$, $B_1$, $C_1$, $B_2$, $C_2$ may be found by a minimization of errors between a hypothesis using Equations (9) or (10) against the PCP values. In at least one embodiment, for the hypothesis, a cost function may be defined, and minimization of the cost function may be performed to find appropriate values to correlate PCP with RPC and/or PR. An equation, such as an activation function, in the hypothesis may be a linear, polynomial, or power function, and represents part of the second estimation model. The estimation or prediction of one or more of an isolated porosity or a connected porosity of the downhole rock formation is based at least on the rock formation petrophysical property value because it can use the correlation between PCP with RPC and/or PR from the estimation models with dielectric measures from a downhole rock formation.

Figure 7:
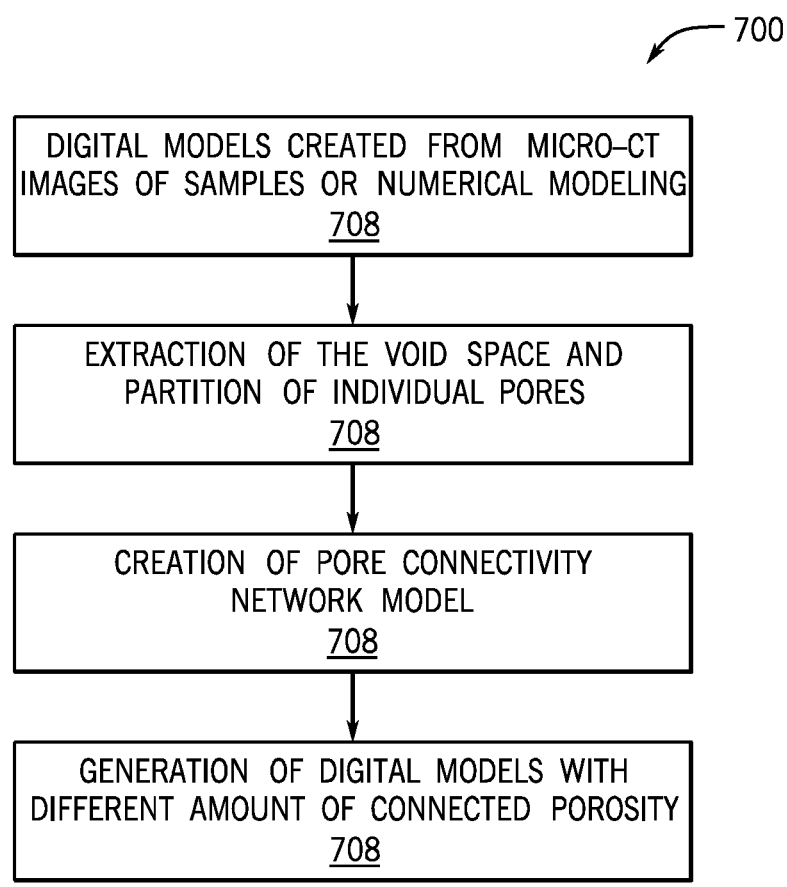
FIG. 7 illustrates a workflow of a method of constructing a porous sample with various amount of connected porosity, according to at least one embodiment.

FIG. 7 illustrates a workflow 700 of a method of constructing a porous sample with various amount of connected porosity, according to at least one embodiment. Step 702 is for creating digital models, forming representations, from micro-CT image of a physical or 3D printed sample or model porous formation. Step 704 is for extracting void space and partitioning of individual pores from such digital models. Step 706 is for creation of a pore connectivity network model forming a further representation having more details than the digital models. These representations may be used instead of the digital models. A synthetic model may be created by numerical modeling, or any other digital images using the representation of step 706. Samples of porous formations in step 702 may include reservoir cores, 3D printed samples, or any other physical porous formations. Step 708 is for generating further digital models with different amounts of connected porosity by altering the pore connectivity network model from step 706. Multiple different representations may be, therefore, provided from step 708, which may be then used in the workflows of FIGS. 4B and 5A.

Figure 8:
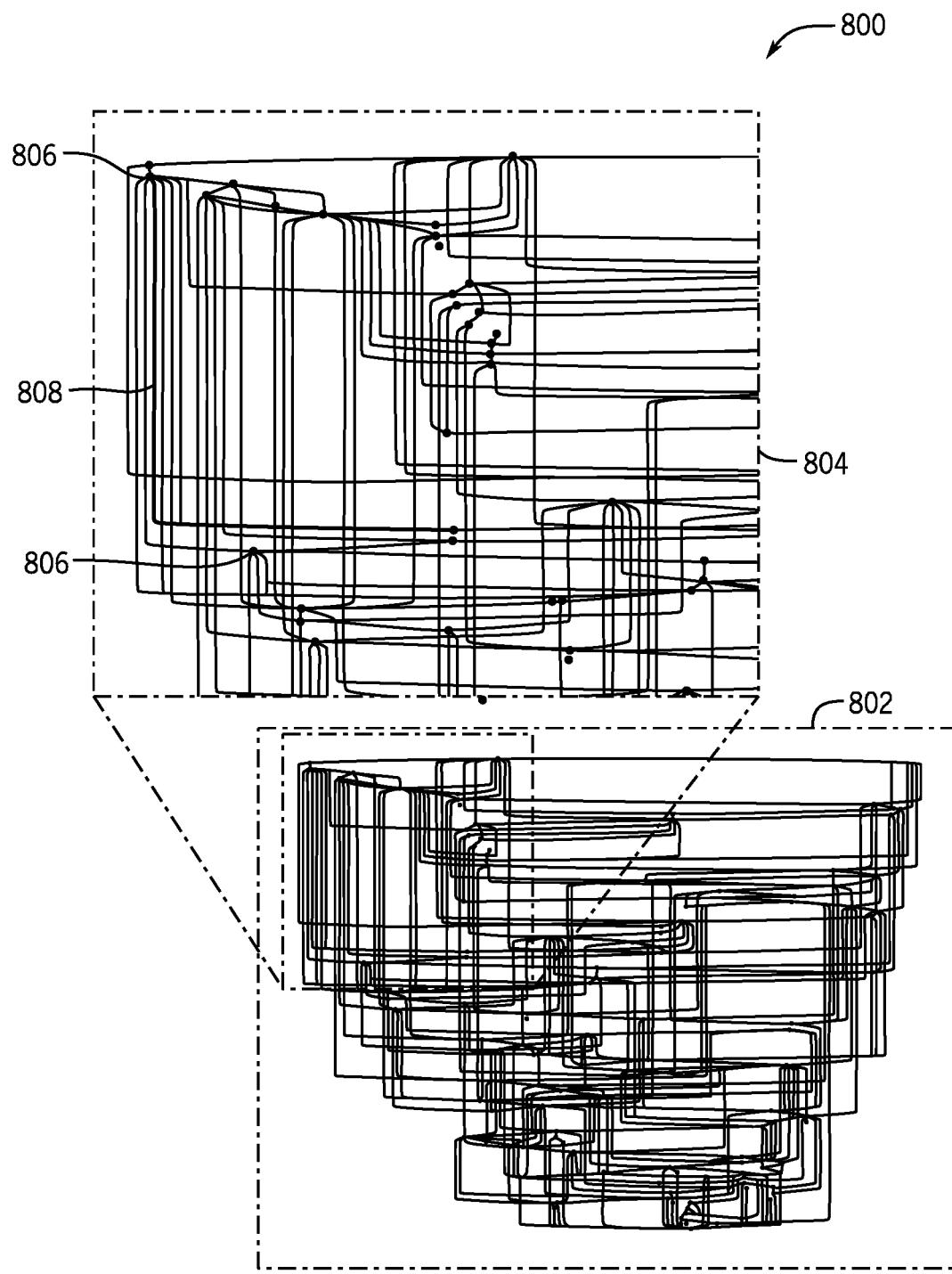
FIG. 8 illustrates aspects of a pore connectivity network model that may be provided from steps of the workflow of FIG. 7, or that may be a result of an alteration of an initial pore connectivity network model of the workflow in FIG. 7.

FIG. 8 illustrates aspects 800 of a pore connectivity network model 802 that may be provided from step 706 or that may be a result of an alteration of an initial pore connectivity network model of step 706. In FIG. 8, a blowup 804 of a portion of the model 802 illustrates that each dot 806 represents an individual pore. The entire model 802 may be used as a representation in the workflows of FIGS. 4B and 5A. Alternatively, selected portions, such as a blowup 804 may be selected to be used in the workflows of FIGS. 4B and 5A. The individual pores are shown as connected via lines 808, which may have different weights depending on the connectivity or throat measurements therein, with a darker and wider line indicating open throats and the thinner or lighter lines indicating a narrow throat. There may be no lines between pores if there are blocked throats there between.

Figure 9:
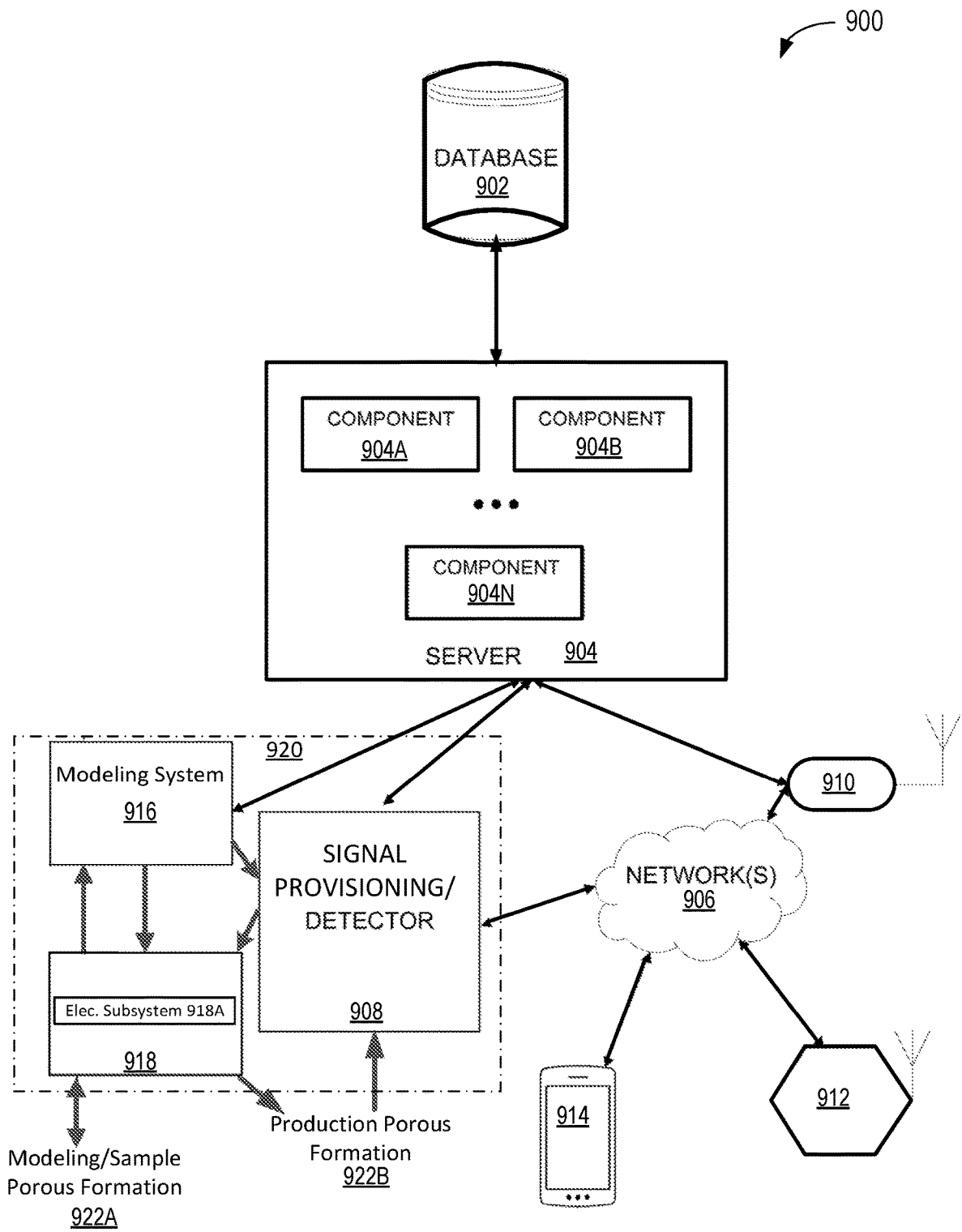
FIG. 9 illustrates computer and network aspects for a system for analysis of a porous formation, according to at least one embodiment.

In at least one embodiment, computer and network aspects 900 for a downhole system as illustrated in FIG. 9, may be used as described herein. In at least one embodiment, these computer and network aspects 900 may include a distributed system. In at least one embodiment, a distributed system 900 may include one or more computing devices 912, 914. In at least one embodiment, one or more computing devices 912, 914 may be adapted to execute and function with a client application, such as with browsers or a stand-alone application, and are adapted to execute and function over one or more network(s) 906.

In at least one embodiment, a server 904, having components 904A-N may be communicatively coupled with computing devices 912, 914 via network 906 and via a receiver device 908, if provided. In at least one embodiment, components 912, 914 include processors, memory and random-access memory (RAM). In at least one embodiment, server 904 may be adapted to operate services or applications to manage functions and sessions associated with database access 902 and associated with computing devices 912, 914. In at least one embodiment, server 904 may be associated with a signal provisioning or detector device 908 of a downhole tool 920.

In at least one embodiment, server 904 may be at a wellsite location, but may also be at a distinct location from a wellsite location. In at least one embodiment, such a server 904 may support a downhole tool or wireline system 920 for analysis of sample and of test porous formation 922A, B using permittivity within a downhole tool. Such a tool or wireline system 920 may be partly downhole and partly at a surface level. Such a tool or wireline system 920 may include an electrical subsystem 918A to perform functions described throughout herein. The subsystem may be a module that may be able to test or train a system on a surface level using sample porous formations 922A and simulations (or other representations, including images) thereof. The subsystem may be encased in one or more computing devices having at least one processor and memory so that the at least one processor can perform functions based in part on instructions from the memory executing in the at least one processor. In at least one embodiment, even though illustrated together, the system boundary 918 may be around a distributed system having a subsystem 918A in different geographic locations, including downhole and surface areas.

A signal provisioning or detector device 908 of a downhole tool 920 is provided to test downhole porous formations 922B using permittivity. In at least one embodiment, a system for analysis of a porous formation of a wellbore, either in a laboratory or a downhole environment, includes a wireline system for the analysis, where such a system may be adapted to transmit, either through wires or wireless, information received therein, from a signal provisioning or detector device back to the surface. In at least one embodiment, modeling performed using modeling or sample porous formations 922A (and representations thereof) may be recorded within a modeling system 916. Required signals for modeling/sample porous formations 922A may be determined by a modeling system 916 and provided by a subsystem 918A.

The modeling system 916 can communicate to a signal provisioning and detector 908 and to a subsystem 918A to enable testing of porous formations 922B that are production or in-laboratory tests, using the models stored in the modeling system 916. For example, each model may require specific signals to gather specific input to be used as testing data against trained ML/AI algorithms. Such signals may include electrical signals to be applied from an electrical subsystem 918A for a production porous formation 922B. Detected results from the electrical signals may be used to determine permittivity measures and to verify its fit within a first estimation model. In at least one embodiment, a system 920 can adjust an estimated permittivity values (and subsequently determined values for RPC, PR, and PCP for a production porous formation 922B based in part on an estimated permittivity value.

In at least one embodiment, such information may be received in a receiver device and transmitted from there. In at least one embodiment, a server 904 may function as a signal provisioning or detector device (with a transmitter providing the actual signal and receiving a return signal) but may also perform other functions. In at least one embodiment, one or more component 904A-N may be adapted to function as a signal provisioning or detector device within a server 904. In at least one embodiment, one or more components 904A-N may include one or more processors and one or more memory devices adapted to function as a detector or receiver device, while other processors and memory devices in server 904 may perform other functions.

In at least one embodiment, a server 904 may also provide services or applications that are software-based in a virtual or a physical environment (such as to support the simulations referenced herein). In at least one embodiment, when server 904 is a virtual environment, then components 904A-N are software components that may be implemented on a cloud. In at least one embodiment, this feature allows remote operation of a system for analysis of a porous formation using permittivity in a wireline system that is a tool, as discussed at least in reference to FIGS. 1-8. In at least one embodiment, this feature also allows for remote access to information received and communicated between any of aforementioned devices. In at least one embodiment, one or more components 904A-N of a server 904 may be implemented in hardware or firmware, other than a software implementation described throughout herein. In at least one embodiment, combinations thereof may also be used.

In at least one embodiment, one computing device 910-914 may be a smart monitor or a display having at least a microcontroller and memory having instructions to enable display of information monitored by a signal provisioning or detector device. In at least one embodiment, one computing device 910-912 may be a transmitter device to transmit directly to a receiver device or to transmit via a network 906 to a receiver device 908 and to a server 904, as well as to other computing devices 912, 914.

In at least one embodiment, other computing devices 912, 914 may include portable handheld devices that are not limited to smartphones, cellular telephones, tablet computers, personal digital assistants (PDAs), and wearable devices (head mounted displays, watches, etc.). In at least one embodiment, other computing devices 912, 914 may operate one or more operating systems including Microsoft Windows Mobile®, Windows® (of any generation), and/or a variety of mobile operating systems such as iOS®, Windows Phone®, Android®, BlackBerry®, Palm OS®, and/or variations thereof.

In at least one embodiment, other computing devices 912, 914 may support applications designed as internet-related applications, electronic mail (email), short or multimedia message service (SMS or MMS) applications and may use other communication protocols. In at least one embodiment, other computing devices 912, 914 may also include general purpose personal computers and/or laptop computers running such operating systems as Microsoft Windows®, Apple Macintosh®, and/or Linux®. In at least one embodiment, other computing devices 912, 914 may be workstations running UNIX® or UNIX-like operating systems or other GNU/Linux operating systems, such as Google Chrome OS®. In at least one embodiment, thin-client devices, including gaming systems (Microsoft Xbox®) may be used as other computing device 912, 914.

In at least one embodiment, network(s) 906 may be any type of network that can support data communications using various protocols, including TCP/IP (transmission control protocol/Internet protocol), SNA (systems network architecture), IPX (Internet packet exchange), AppleTalk®, and/or variations thereof. In at least one embodiment, network(s) 906 may be a networks that is based on Ethernet, Token-Ring, a wide-area network, Internet, a virtual network, a virtual private network (VPN), a local area network (LAN), an intranet, an extranet, a public switched telephone network (PSTN), an infra-red network, a wireless network (such as that operating with guidelines from an institution like the Institute of Electrical and Electronics (IEEE) 802.11 suite of protocols, Bluetooth®, and/or any other wireless protocol), and/or any combination of these and/or other networks.

In at least one embodiment, a server 904 runs a suitable operating system, including any of operating systems described throughout herein. In at least one embodiment, server 904 may also run some server applications, including HTTP (hypertext transport protocol) servers, FTP (file transfer protocol) servers, CGI (common gateway interface) servers, JAVA® servers, database servers, and/or variations thereof. In at least one embodiment, a database 902 is supported by database server feature of a server 904 provided with front-end capabilities. In at least one embodiment, such database server features include those available from Oracle®, Microsoft®, Sybase®, IBM® (International Business Machines), and/or variations thereof.

In at least one embodiment, a server 904 is able to provide feeds and/or real-time updates for media feeds. In at least one embodiment, a server 904 is part of multiple server boxes spread over an area but functioning for a presently described process for analysis of a porous formation. In at least one embodiment, server 904 includes applications to measure network performance by network monitoring and traffic management. In at least one embodiment, a provided database 902 enables information storage from a wellsite, including user interactions, usage patterns information, adaptation rules information, and other information.

While techniques herein may be subject to modifications and alternative constructions, these variations are within spirit of present disclosure. As such, certain illustrated embodiments are shown in drawings and have been described above in detail, but these are not limiting disclosure to specific form or forms disclosed; and instead, cover all modifications, alternative constructions, and equivalents falling within spirit and scope of disclosure, as defined in appended claims.

Terms such as a, an, the, and similar referents, in context of describing disclosed embodiments (especially in context of following claims), are understood to cover both singular and plural, unless otherwise indicated herein or clearly contradicted by context, and not as a definition of a term. Including, having, including, and containing are understood to be open-ended terms (meaning a phrase such as, including, but not limited to) unless otherwise noted. Connected, when unmodified and referring to physical connections, may be understood as partly or wholly contained within, attached to, or joined together, even if there is something intervening.

Recitation of ranges of values herein are merely intended to serve as a shorthand method of referring individually to each separate value falling within range, unless otherwise indicated herein and each separate value is incorporated into specification as if it were individually recited herein. In at least one embodiment, use of a term, such as a set (for a set of items) or subset unless otherwise noted or contradicted by context, is understood to be nonempty collection including one or more members. Further, unless otherwise noted or contradicted by context, term subset of a corresponding set does not necessarily denote a proper subset of corresponding set, but subset and corresponding set may be equal.

Conjunctive language, such as phrases of form, at least one of A, B, and C, or at least one of A, B and C, unless specifically stated otherwise or otherwise clearly contradicted by context, is otherwise understood with context as used in general to present that an item, term, etc., may be either A or B or C, or any nonempty subset of set of A and B and C. In at least one embodiment of a set having three members, conjunctive phrases, such as at least one of A, B, and C and at least one of A, B and C refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, terms such as plurality, indicates a state of being plural (such as, a plurality of items indicates multiple items). In at least one embodiment, a number of items in a plurality is at least two but can be more when so indicated either explicitly or by context. Further, unless stated otherwise or otherwise clear from context, phrases such as based on means based at least in part on and not based solely on.

Operations of methods in FIGS. 4B, 4C, 5A, and 7 includes sub-steps described herein that can be performed in any suitable order unless otherwise indicated herein or otherwise clearly contradicted by context. In at least one embodiment, a method includes processes such as those processes described herein (or variations and/or combinations thereof) that may be performed under control of one or more computer systems configured with executable instructions and that may be implemented as code (e.g., executable instructions, one or more computer programs or one or more applications) executing collectively or exclusively on one or more processors, by hardware or combinations thereof.

In at least one embodiment, such code may be stored on a computer-readable storage medium. In at least one embodiment, such code may be a computer program having instructions executable by one or more processors. In at least one embodiment, a computer-readable storage medium is a non-transitory computer-readable storage medium that excludes transitory signals (such as a propagating transient electric or electromagnetic transmission) but includes non-transitory data storage circuitry (such as buffers, cache, and queues) within transceivers of transitory signals. In at least one embodiment, code (such as executable code or source code) is stored on a set of one or more non-transitory computer-readable storage media having stored thereon executable instructions (or other memory to store executable instructions) that, when executed (such as a result of being executed) by one or more processors of a computer system, cause computer system to perform operations described herein.

In at least one embodiment, a set of non-transitory computer-readable storage media includes multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—in at least one embodiment, a non-transitory computer-readable storage medium store instructions and a main central processing unit (CPU) executes some of instructions while other processing units execute other instructions. In at least one embodiment, different components of a computer system have separate processors and different processors execute different subsets of instructions.

In at least one embodiment, computer systems are configured to implement one or more services that singly or collectively perform operations of processes described herein and such computer systems are configured with applicable hardware and/or software that enable performance of operations. In at least one embodiment, a computer system that implements at least one embodiment of present disclosure is a single device or is a distributed computer system having multiple devices that operate differently such that distributed computer system performs operations described herein and such that a single device does not perform all operations.

In at least one embodiment, even though the above discussion provides at least one embodiment having implementations of described techniques, other architectures may be used to implement described functionality, and are intended to be within scope of this disclosure. In addition, although specific responsibilities may be distributed to components and processes, they are defined above for purposes of discussion, and various functions and responsibilities might be distributed and divided in different ways, depending on circumstances.

In at least one embodiment, although subject matter has been described in language specific to structures and/or methods or processes, it is to be understood that subject matter claimed in appended claims is not limited to specific structures or methods described. Instead, specific structures or methods are disclosed as example forms of how a claim may be implemented.

From all the above, a person of ordinary skill would readily understand that the tool of the present disclosure provides numerous technical and commercial advantages and can be used in a variety of applications. Various embodiments may be combined or modified based in part on the present disclosure, which is readily understood to support such combination and modifications to achieve the benefits described above.

What is claimed is:

1. A system for downhole wellbore or testing operations, the system comprising:
   an electrical subsystem to provide electrical signals for one or more of a porous formation or a representation of the porous formation; and
   at least one processor to execute instructions from a memory to cause the system to:
   determine one or more dielectric property values that relate changes in permittivity measurements with times or frequencies based in part on the electrical signals;
   generate a model using the one or more dielectric property values, the model providing structural property values associated with isolated and connected porosities of the porous formation or the representation of the porous formation;

determine a rock formation petrophysical property value for porous formation or the representation of the porous formation using the model and using a total porosity of the porous formation or the representation of the porous formation;

estimate or predict one or more of an isolated porosity or a connected porosity of a downhole rock formation based at least on the rock formation petrophysical property value; and enable the wellbore or testing operation based at least in part on the estimated or predicted one or more of the isolated porosity or the connected porosity of the downhole rock formation.

2. The system of claim 1, wherein the one or more dielectric property values is a rate of permittivity change (RPC) or permittivity ratio (PR).

3. The system of claim 2, wherein the RPC is a slope of the best-fit at a determined frequency interval of the curve.

4. The system of claim 2, wherein the PR is a ratio of a first permittivity value and a second permittivity value of the permittivity measures, the first permittivity value being a difference of two permittivity measures taken at two determined frequencies of the curve, and the second permittivity value being a permittivity at a third determined frequency that is higher than the two determined frequencies.

5. The system of claim 1, wherein the total porosity is one or more of a Nuclear Magnetic Resonance (NMR) measurement, a bulk density measurement, or a neutron porosity measurement associated with the porous formation.

6. The system of claim 1, wherein the connected porosity of the downhole rock formation is determined using the total porosity and a percentage of the connected porosity (PCP) of the rock formation petrophysical property value.

7. The system of claim 6, wherein the PCP is determined using one or more of an RPC or a PR of the one or more dielectric property values and using the total porosity, a water saturation measurement, a temperature measurement, a water salinity measurement, a wettability measurement, and a mineralogy measurement for the porous formation or the representation of the porous formation.

8. The system of claim 6, wherein the isolated porosity is determined using a difference of the total porosity and the connected porosity.

9. The system of claim 1, wherein the representation of the porous formation comprises one or more of a synthetic model from a random sphere pack or comprises a computerized tomography (CT) image from a reservoir rock.

10. The system of claim 1, wherein the porous formation or the representation of the porous formation utilizes two samples that are taken alone or as a combination, wherein a first of the two samples has a determined porosity and a second of the two samples has a determined PCP, and wherein the determined porosity and the determined PCP are combined to create the porous formation or the representation of the porous formation.

11. A method for wellbore or testing operations, the method comprising:

providing, using an electrical subsystem, electrical signals for one or more of the porous formation or a representation of the porous formation;

determining, by a processor, one or more dielectric property values that relate changes in permittivity measurements with times or frequencies based in part on the electrical signals;

generating, by the processor, a model using the one or more dielectric property values, the model providing structural property values associated with isolated and connected porosities of the porous formation or the representation of the porous formation;

determining a rock formation petrophysical property value for porous formation or the representation of the porous formation using the model and using a total porosity of the porous formation or the representation of the porous formation;

estimating or predicting one or more of an isolated porosity or a connected porosity of a downhole rock formation based at least on the rock formation petrophysical property value; and performing the wellbore or testing operation based at least in part on the estimated or predicted one or more of the isolated porosity or the connected porosity of the downhole rock formation.

12. The method of claim 11, wherein the one or more dielectric property values is a rate of permittivity change (RPC) or permittivity ratio (PR).

13. The method of claim 12, wherein the RPC is a slope of the best-fit at a determined frequency interval of the curve.

14. The method of claim 13, wherein the total porosity is one or more of a Nuclear Magnetic Resonance (NMR) measurement, a bulk density measurement, or a neutron porosity measurement associated with the porous formation.

15. The method of claim 12, wherein the PR is a ratio of a first permittivity value and a second permittivity value of the permittivity measures, the first permittivity value being a difference of two permittivity measures taken at two determined frequencies of the curve, and the second permittivity value being a permittivity at a third determined frequency that is higher than the two determined frequencies.

16. The method of claim 11, wherein the connected porosity of the downhole rock formation is determined using the total porosity and a percentage of the connected porosity (PCP) of the rock formation petrophysical property value.

17. The method of claim 16, wherein the PCP is determined using one or more of an RPC or a PR of the one or more dielectric property values and using the total porosity, a water saturation measurement, a temperature measurement, a water salinity measurement, a wettability measurement, and a mineralogy measurement for the porous formation or the representation of the porous formation.

18. The method of claim 16, wherein the isolated porosity is determined using a difference of the total porosity and the connected porosity.

19. The method of claim 11, wherein the representation of the porous formation comprises one or more of a synthetic model from a random sphere pack or comprises a computerized tomography (CT) image from a reservoir rock.

20. The method of claim 11, wherein the porous formation or the representation of the porous formation utilizes two samples that are taken alone or as a combination, wherein a first of the two samples has a determined porosity and a second of the two samples has a determined PCP, and wherein the determined porosity and the determined PCP are combined to create the porous formation or the representation of the porous formation.

* * * * *